United States Patent

[11] 3,568,702

[72] Inventor Miles O. Dustin
Mentor, Ohio

[21] Appl. No. 805,298
[22] Filed Mar. 7, 1969
[45] Patented Mar. 9, 1971
[73] Assignee The United States of America as represented by the Administrator of the National Aeronautics and Space Administration

[54] PNEUMATIC OSCILLATOR
7 Claims, 1 Drawing Fig.

[52] U.S. Cl. .......... 137/81.5
235/201
[51] Int. Cl. .......... F15c 1/12
[50] Field of Search .......... 137/81.5; 235/201

[56] References Cited
UNITED STATES PATENTS

| | | | |
|---|---|---|---|
| 3,117,593 | 1/1964 | Sowers | 137/81.5X |
| 3,185,166 | 5/1965 | Horton et al. | 137/81.5 |
| 3,486,518 | 12/1969 | Howland | 137/81.5 |

*Primary Examiner*— William R. Cline
*Attorneys*—N. T. Musial, G. E. Shook and G. T. McCoy

ABSTRACT: A pneumatic oscillator or analogue-to-digital converter includes a fluid oscillator circuit, a conditioning circuit and an output selector circuit. Three bistable fluid amplifiers with interconnecting pneumatic R-C circuits make up the oscillator which has a frequency range down to 0 pulses per second. Control signal pressure is supplied to the oscillator through the conditioning circuit which controls the frequency range of the oscillator. Output pulses from the oscillator are directed to one or the other of a pair of output ports through an output selecting circuit.

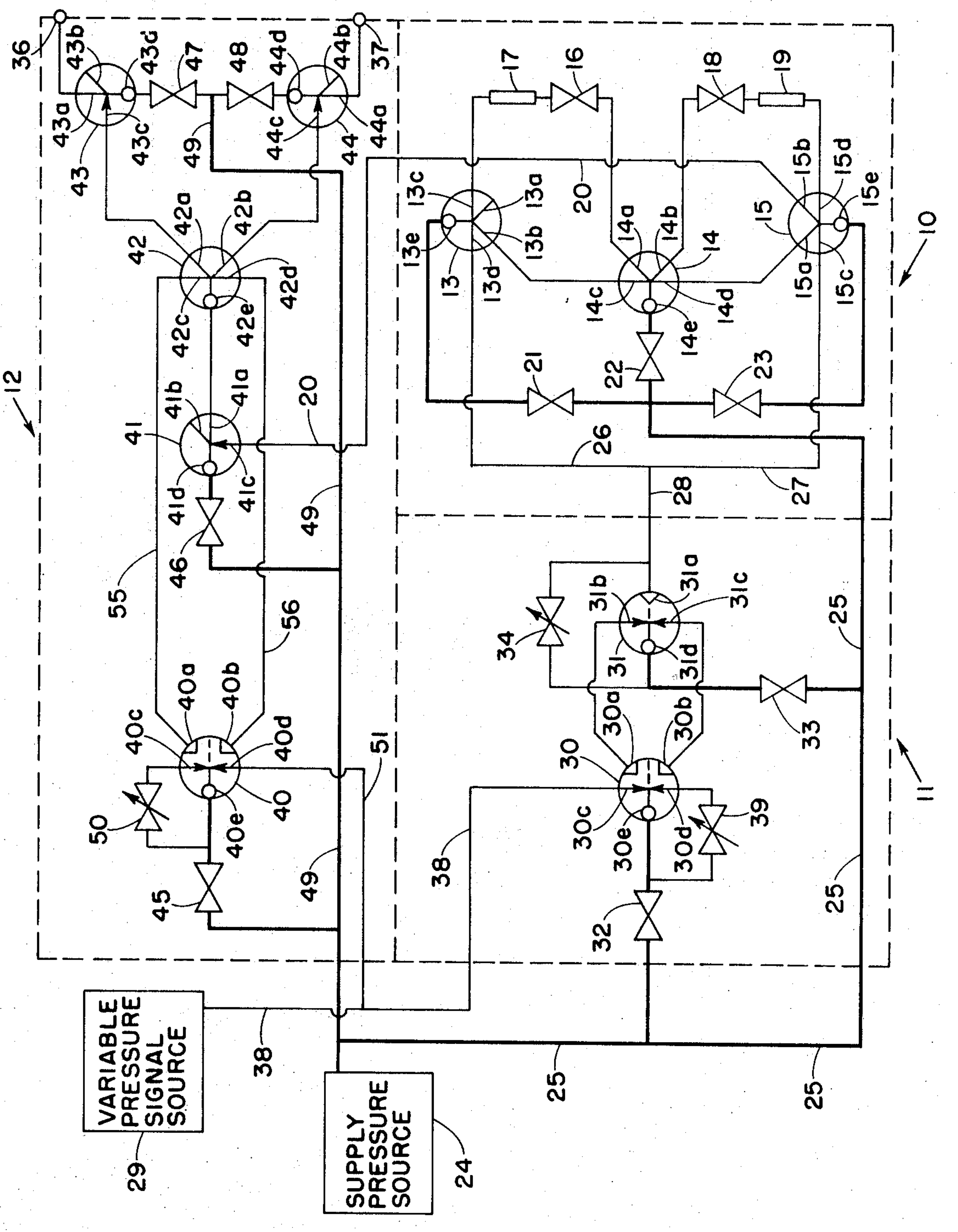
INVENTOR
MILES O. DUSTIN
BY [signature]
ATTORNEYS

PNEUMATIC OSCILLATOR

ORIGIN OF THE INVENTION

This invention described herein was made by an employee of the U.S. Government and may be manufactured and used by or for the Government of the United States of America for governmental purposes without the payment of any royalties thereon or therefor.

BACKGROUND OF THE INVENTION

This invention relates to fluidic oscillators and is directed more particularly to an analogue-to-digital converter utilizing fluid amplifiers.

Pneumatic oscillators which provide variable frequency output pulses are known in the prior art. However, such oscillators have not been able to provide an output pulse frequency which is variable over a range down to 0 pulses per second. In general, substantially all such oscillators have not been able to provide an output frequency much below 50 percent of their maximum output frequency.

Because of the susceptibility of electronic semiconductor control circuits to radiation damage from nuclear engines, attempts are now being made to provide suitable pneumatic control systems for nuclear powered spacecraft. Many of these pneumatic control systems utilize pneumatic stepping neutator motors. In order that these stepping motors may be varied in rotational speed from a maximum in one direction down to zero and up to a maximum in the opposite direction, it is necessary that they be supplied with fluid of variable frequency pulsating pressure. It is also required that the pulse frequency may be varied in a continuous manner from some maximum frequency down to 0 pulses per second.

OBJECTS AND SUMMARY OF THE INVENTION

It is an object of the invention to provide a new and novel fluid oscillator.

It is another object of the invention to provide a fluid oscillator whose output frequency can be adjusted down to 0 pulses per second (PPS).

Still another object of the invention is to provide a fluid oscillator formed by three identical bistable fluid amplifiers.

It is a further object of the invention to provide an analogue-to-digital converter suitable for driving a pneumatic stepping motor in either a forward or backward direction.

It is yet another object of the invention to provide a fluidic analogue-to-digital converter of the above type whose pulse output frequency varies in an inverse-linear relationship to a control pressure signal.

In summation, the invention provides a fluid oscillator or analogue-to-digital converter whose frequency may be adjusted down to 0 PPS by means of a variable control signal which is passed through a conditioning circuit. The converter also includes a conditioning circuit to restrict the range of operation of the oscillator and an output selector circuit to control the output of the oscillator circuit.

Other objects and advantages of the invention will become apparent from the following specification and the single FIGURE which is a schematic drawing of an analogue-to-digital converter embodying the invention.

DESCRIPTION OF THE PREFERRED EMBODIMENT

Referring now to the single FIGURE, it will be seen that an analogue-to-digital converter embodying the invention may include by way of example an oscillator circuit 10, a conditioning circuit 11 and an output selector circuit 12. The oscillator section 10 may include bistable fluid amplifiers 13, 14 and 15, each having respective first and second receiver output channels **13*a* and 13*b*, 14*a* and 14*b* and 15*a* and 15*b*; first and second control signal channels 13*c* and 13*d*, 14*c* and 14*d* and 15*c* and 15*d*; and respective supply pressure input ports 13*e*, 14*e* and 15*e***.

The oscillator circuit is formed by connecting the receiver channel **14*a* of fluid amplifier 14 which serves as a switching control means to control channel 13*c* of fluid amplifier 13 through an orifice 16 and a chamber 17 and by connecting the receiver channel 14*b* to the control channel 15*d* through an orifice 18 and a chamber 19. Orifices 16, 18 serve as pneumatic resistances while chambers 17, 19 sense as pneumatic capacitances. These pneumatic R-C circuits serve as pulse delay means. Receiver channels 13*b* and 15*a* are connected to control channels 14*c* and 14*d*, respectively, of the fluid amplifier 14** which serves as a switching control means.

The output pulses of the oscillator 10 are taken from the receiver channel **15*b* and are transmitted to the output circuit selector 12 through a conduit 20. Supply pressure for the oscillator circuit 10 is provided by connecting the supply input ports 13*e*, 14*e* and 15*e* through respective pressure reducing orifices 21, 22 and 23 to a source of fluid pressure 24 through a pressure supply conduit 25**.

In order to controllably vary the output frequency of the oscillator 10, the control channels **13*d* and 15*c* are connected through respective conduits 26 and 27 to the conditioning circuit 11 by means of a control signal conduit 28. The control signal pressure for the oscillator 10 is ultimately obtained from the variable pressure signal source 29. However, the conditioning circuit modifies the signal pressure from the variable pressure signal source 29 to limit the frequency range of the oscillator circuit 10 and to linearize the output frequency of the oscillator with respect to the pressure of the variable pressure signal source 29**, as will be explained presently.

Operation of the oscillator circuit 10 is as follows:

Assuming that fluid pressure appears in the receiver output **14*a* of the amplifier 14 an exponentially increasing pressure will be applied to the control channel 13*c* of amplifier 13 as the chamber 17 fills with fluid. When the pressure in the control channel 13*c* becomes greater than the control pressure in the control channel 13*d*, output pressure of the amplifier 13 will be switched from the receiver dump channel 13*a* to the receiver output channel 13*b*. The pressure from receiver output channel 13*b* is applied to the control channel 14*c* of fluid amplifier 14 causing its output pressure to switch from the receiver output channel 14*a* to receiver output channel 14*b***.

When the fluid amplifier 14 switches as just described, the pressure applied to the control channel **13*c* through orifice 16 and chamber 17 will decay and the output of amplifier 13 will again switch back to receiver dump channel 13*a*. This switching of amplifier 13, however, will not affect fluid amplifier 14. This is because amplifier 14 is bistable and the removal of pressure from control channel 14*c* by the switching of amplifier 13 will not cause the output of amplifier 14 to switch back to receiver output channel 14*a* from receiver output channel 14*b***.

The pressure from receiver output channel **14*b* is applied to the control channel 15*d* of fluid amplifier 15 through the orifice 18 and the chamber 19. As the pressure in the control channel 15*d* increases, it will reach a point where it exceeds the control pressure in control channel 15*c*. This will cause the output pressure of amplifier 15 to switch from receiver output channel 15*b* to receiver output channel 15*a*. This output from channel 15*a* applies pressure to the control channel 14*d* of fluid amplifier 14. Consequently, the output of amplifier 14 switches from receiver output channel 14*b* to receiver output channel 14*a*. At this point, the operation of the oscillator circuit 10**, as just described, begins a new cycle.

The conditioning circuit 11 may include a proportional fluid amplifier 30 and a center-output, proportional amplifier 31. The fluid amplifiers 30 and 31 are supplied with fluid by connecting respective supply input ports **30*e* and 31*d* therein to the pressure supply conduit 25 through respective pressure reducing orifices 32 and 33. The conduit 28 which supplies control signal pressure to the oscillator section 10 is connected to a center output port of the fluid amplifier 31**.

When no pressure is applied to a control channel **31*b* or to a control channel 31*c***, the fluid pressure at the center output port 31*a* is maximum and is of such a magnitude as to render the oscillator section 10 inoperative; that is, the oscillator output is 0 PPS. Decreasing pressure at the center output port 31*a* causes the output frequency of the oscillator to increase.

To the end that the output frequency of the oscillator will be limited to a prescribed maximum frequency, the pressure in the conduit 28 must be prevented from dropping below a prescribed minimum value. To that end, a variable orifice 34 is connected between the conduit 28 and the orifice 33. The variable orifice 34, which may be termed a conditioning circuit bypass means, provides a bypass path around the fluid amplifier 31 and thereby prevents the pressure in conduit 28 from dropping below the prescribed minimum value.

In order to operate a pneumatic stepping motor in either a forward or backward direction, first and second converter output ports 36 and 37 are provided in the output selector circuit 12. Pulses supplied from the converter output port 36 to a pneumatic stepping motor will cause it to rotate in one direction while pulses supplied from the output port 37 will cause it to rotate in the opposite direction. It will be seen that with no output from either of the converter output ports 36, 37 the output frequency of the oscillator 10 must be 0 PPS.

Accordingly, the control signal pressure of the variable pressure signal source 29 must have a null pressure value or null point such that change of the signal pressure above or below the null value will produce output pulses at one or the other of the converter output ports 36, 37. Also, the output frequency of the oscillator circuit 10 must increase when the control signal pressure either increases or decreases from the null value.

To the end that the oscillator 10 will operate in accordance with the condition just described, a control channel 30*c* of the proportional amplifier 30 is connected to the variable pressure signal source 29 via a control pressure conduit 38 while a control channel 30*d* is connected through a variable orifice 39 to the pressure reducing orifice 32. An output port 30*a* and an output port 30*b* of amplifier 30 are connected to a control channel 31*b* and a control channel 31*c*, respectively, of the amplifier 31.

When fluid is supplied to the control channels 31*b*, 31*c* at equal pressure, the fluid entering the supply port 31*d* forms a jet of fluid which is aimed directly at the output port 31*a* and, consequently, into the control signal channel 28. The output of amplifier 31 is now at maximum pressure, which pressure is determined by the orifice 33. This pressure is so selected as to cause the output frequency of the oscillator 10 to be 0 PPS when the pressure in conduit 38 is at the null value. Thus, amplifier 31 serves as a null pressure selecting means.

The previously mentioned null pressure value of the signal output pressure of the variable pressure signal source 29 occurs when the pressure in the signal pressure conduit 38, as supplied to control channel 30*c*, equals the pressure supplied to control channel 30*d* through the variable orifice 39. At the null pressure, the output pressures at output ports 30*a* or 30*b* are equal and, as a result, the output pressure of amplifier 31 is maximum as previously described.

The output selector circuit 12 determines which of the converter outputs 36, 37 will supply pulses to a suitable utilization device such as a pneumatic stepping motor when the output pressure of the signal source 29 varies above or below the null value. The output selector circuit 12 may include a proportional amplifier 40, a monostable amplifier 41, a bistable amplifier 42 and monostable output amplifiers 43 and 44. The amplifiers 40, 41, 43 and 44 have respective supply input ports 40*e*, 41*d*, 43*d* and 44*d* which are connected through respective pressure reducing orifices 45, 46, 47, 48 and through a pressure supply conduit 49 to the pressure supply source 24.

The amplifier 40 operates substantially in the same manner as the amplifier 40 and is similarly connected to function as a null pressure selecting means. Thus, a control channel 40*c* receives pressure through a variable orifice 50 which is connected to the orifice 45. A control channel 40*d* is connected through a conduit 51 to the signal pressure conduit 38. Accordingly, when the output pressure of the signal source 29 is at its null value, the pressure in the control channel 40*d* will be equal to the pressure in the control channel 40*c* and the output pressure present at output ports 40*a* and 40*b* provided in the amplifier 40 will be equal.

To provide pressure pulses at the converter output ports 36 and 37, these ports are connected respectively to a receiver output channel 43*a* of the output amplifier 43 and to a receiver output channel 44*a* of the amplifier 44. A control channel 43*c* of amplifier 43 and a control channel 44*c* of amplifier 44 are connected to a receiver output 42*a* and a receiver output channel 42*b*, respectively, of the amplifier 42 which serves as an output selecting means.

The output of amplifier 42 is controlled by connecting a control channel provided therein to the output port 40*a* of amplifier 40 through a conduit 55 and by connecting a control channel 42*d* therein to the output port 40*b* of amplifier 40 via a conduit 56. An input supply port 42*e* provided in the amplifier 42, unlike the input supply ports in all the other amplifiers, is connected to a receiver output channel 41*a* of the amplifier 41 to receive pulses in accordance with those appearing in a control channel 41*c* which is connected to the receiver output 15*b* of amplifier 15 through the conduit 20.

Each of the monostable amplifiers 41, 43 and 44 are provided with respective receiver dump channels 41*b*, 43*b* and 44*b*, respectively, which are open to the environment of the converter. When pressure is present in any of the control channels 41*c*, 43*c* or 44*c*, the fluid being supplied to the supply input ports of those amplifiers is dumped. The amplifiers 41, 43 and 44 function as NOR gates.

When the oscillator 10 is running, pulses are supplied to the control channel 41*c* of the amplifier 41 through conduit 20. Each pulse produces an output signal in the receiver dump channel 41*b* resulting in an inverted form of the pulse appearing in the receiver output channel 41*a* and at a supply input port 42*e* of the bistable amplifier 42. Because the oscillator 10 is running, the output pressure of the variable pressure signal source 29 must be something other than its null value. Accordingly, the inverted oscillator pulses will be present in either receiver output channel 42*a* or receiver output channel 42*b* depending on whether the output pressure of the source 29 is above or below the null value.

If the inverted pulses are present in receiver output channel 42*a* they are transmitted to control channel 43*c* of the output amplifier 43. This causes the invented pulses themselves to be invented in the receiver output channel 43*a* because each of the inverted pulses causes the fluid being supplied to the input supply port 43*d* to be dumped by the receiver dump channel 43*b*.

The receiver output channel 44*a* of the output amplifier 44 is connected to the converter output port 37. Consequently, if the inverted pulses appear in receiver output channel 42*b* rather than 42*a*, they will be transmitted to the control channel 44*c* of the output amplifier 44 and then to the converter output port 37 in the same manner in which they are transmitted through output amplifier 36.

It will be understood that changes and modifications may be made to the foregoing pneumatic oscillator without departing from the spirit and scope of the invention as set forth in the claims appended hereto.

I claim:

1. A pneumatic oscillator adapted to operate from a supply pressure source to provide variable frequency output pulses in response to control pressure from a variable pressure signal source comprising:

first and second bistable fluid amplifiers each having supply input means, first and second output means and first and second control means;

switching control means comprising a third bistable fluid amplifier having supply input means, first and second output means and first and second control means;

first and second pulse delay means connected between said first and second output means of said switching control means and said first and second control means, respectively, of said first and second bistable fluid amplifiers;

means for connecting said second output means of said first bistable fluid amplifier and said first output means of said second bistable fluid amplifiers to said first and second control means, respectively, of said switching control means; and means for connecting said second and first control means of said first and second bistable fluid amplifiers, respectively, to said variable pressure signal source.

2. The circuitry of claim 1 wherein conditioning circuit means is connected between said control means of said first and second amplifiers and said variable pressure signal source for preventing the control pressure applied to said control means of said first and second fluid amplifiers from dropping below a prescribed minimum value and to provide sufficient control pressure to reduce the frequency of the oscillator to 0 pulses per second when the output pressure of said variable pressure source is at a null value.

3. The circuitry of claim 2 wherein said conditioning circuit comprises:

a first proportional fluid amplifier having first and second control channels and first and second receiver output channels;

bias means for applying pressure to said first control channel of said first proportional amplifier;

means connecting said second control channel of said first proportional amplifier to said variable pressure signal source;

a center output proportional amplifier having first and second control channels and a receiver output channel, said control channels being connected to respective ones of said first and second receiver output channels of said first proportional amplifier;

means for connecting said receiver output channel of said center output proportional amplifier to said control means of respective ones of said bistable amplifiers comprising said pneumatic oscillator; and bypass means connected between said receiver output of said center output proportional amplifier and said supply pressure source to prevent control pressure applied to said control means of said first and second bistable amplifiers from decreasing below a predetermined minimum value.

4. The circuitry of claim 2 and further including output selector means connected in controlled relationship to said variable pressure source, said output selector means including:

first and second converter output means, bistable fluid amplifier means having output means, control means and supply input means;

means connecting said output means of said bistable fluid amplifier means to respective ones of said converter output means;

means for connecting said supply input means of said bistable amplifier in pulse receiving relationship to said oscillator;

null pressure selecting means connected in controlling relationship to said control means of said bistable fluid amplifier and in control pressure receiving relationship to said variable pressure signal source for producing output pulses at one of said converter output means when the pressure of said variable pressure signal source is above said null value and at the other of said converter output means when the pressure is below said null value.

5. The circuitry of claim 4 wherein a first NOR gate is connected between said supply input means of said bistable amplifier means and said oscillator and second and third NOR gates are connected between said output means of said bistable amplifier means and respective ones of said first and second converter output means.

6. The circuitry of claim 1 and further including first and second converter output ports; output selector means for causing oscillator output pulses to appear at said first converter output port when the pressure of said variable signal means is above a predetermined null value and at said second converter output port when said pressure of said variable signal source is below said null value, means for connecting said output selector circuit in controlled relationship to said variable pressure signal source, and means for connecting said output selector means in pulse receiving relationship to said oscillator.

7. The oscillator of claim 1 wherein said first and second pulse delay means each comprise a pneumatic R-C circuit.